United States Patent [19]

Burke et al.

[11] Patent Number: 4,879,743
[45] Date of Patent: Nov. 7, 1989

[54] PBX AND ADJUNCT USING MULTI-FREQUENCY TONES FOR COMMUNICATION THEREBETWEEN

[75] Inventors: Edmund T. Burke, West Long Branch; Daniel H. Dawdy, Marlboro; Timothy M. Rubert, W. Long Branch, all of N.J.

[73] Assignees: American Telephone and Telegraph Company, New York, N.Y.; AT&T Information Systems Inc., Morristown, N.J.

[21] Appl. No.: 252,477

[22] Filed: Oct. 3, 1988

[51] Int. Cl.⁴ .............................................. H04M 7/06
[52] U.S. Cl. .................................... 379/142; 379/201; 379/210; 379/211; 379/213; 379/212; 379/214; 379/235
[58] Field of Search ............... 379/142, 201, 210, 212, 379/211, 213, 214, 225, 235

[56] References Cited

U.S. PATENT DOCUMENTS

| | | | |
|---|---|---|---|
| 3,264,415 | 8/1966 | Burns et al. | 379/231 |
| 3,443,032 | 5/1969 | Mitsui | 379/105 |
| 4,150,257 | 4/1979 | Fenton et al. | 379/212 X |
| 4,304,968 | 12/1981 | Klausner | 379/142 X |
| 4,571,462 | 2/1986 | Jannssen | 379/361 |
| 4,646,346 | 2/1987 | Emerson et al. | 379/214 |
| 4,674,082 | 6/1987 | Flanagin et al. | 370/60 |

Primary Examiner—James L. Dwyer
Attorney, Agent, or Firm—John A. Caccuro

[57] ABSTRACT

A PBX system is responsive to an incoming call which is directed to an adjunct of the system for sending a ringing signal over a station facility to the adjunct. When the adjunct goes off-hook, the system outputs to the adjunct over the station facility multi-frequency tones containing information associated with the incoming call prior to establishing a connection between the adjunct and calling party. The information selects the proper operating mode of the adjunct and provides other call processing information to the adjunct. The adjunct communicates information to the PBX using a switch-hook flash and multi-frequency tones.

20 Claims, 10 Drawing Sheets

| MODE CODE 241 | CALLING PARTY 242 | CALLED PARTY 243 |
|---|---|---|
| #00 - DIRECT DIAL ACCESS | ✓ | |
| #01 - DIRECT DIAL ACCESS - TRUNK | | |
| #02 - COVERAGE - CALLER IS A STATION | ✓ | ✓ |
| #03 - COVERAGE - CALLER IS A TRUNK | | ✓ |
| #04 - SPARE | | |
| #05 - LEAVE WORD CALLING | ✓ | ✓ |
| #06 - PLEASE UPDATE MW LAMPS | | |
| #07 - MAINTENANCE TEST | • | |
| #08 - ADJUNCT PORT TAKEN OUT OF SERVICE | | PORT PDC |
| ##99 - DISCONNECT | | |

PBX AND ADJUNCT USING MULTI-FREQUENCY TONES FOR COMMUNICATION THEREBETWEEN

TECHNICAL FIELD

This invention relates to private branch exchanges (PBXs) and, more particularly, to an adjunct interface therefor having a touch tone outpulsing capability.

BACKGROUND OF THE INVENTION

Some advanced telecommunication services provided by a PBX often require the use of an adjunct connected over a telephone line to the PBX. These services may include auto attendant, call management, etc., and typically require an additional data link to be connected between the adjunct and the PBX. Unfortunately, the data link requires special and expensive interface hardware and software at the PBX and adjunct to provide the data communication therebetween. Moreover, since this data link requires a separate connection facility, it thereby reduces the reliability of the adjunct to PBX connection.

SUMMARY OF THE INVENTION

In accordance with the present invention, a PBX is arranged to output information on incoming calls to a connected adjunct in the form of dual tone multi-frequency (DTMF) tones and the adjunct is arranged to receive the DTMF tones from the PBX to select operating mode thereat. More particularly, a communication system is responsive to an incoming call directed to an adjunct of the system for sending a ringing signal over a facility to an adjunct. When the adjunct goes off-hook, the system outputs over the facility DTMF tones containing call information prior to establishing a connection between the adjunct and calling party. The adjunct receives the call information which identifies the proper operating mode for the adjunct. The adjunct communicates information to the PBX using a switch-hook flash and DTMF tones.

GENERAL DESCRIPTION

Figure 1:
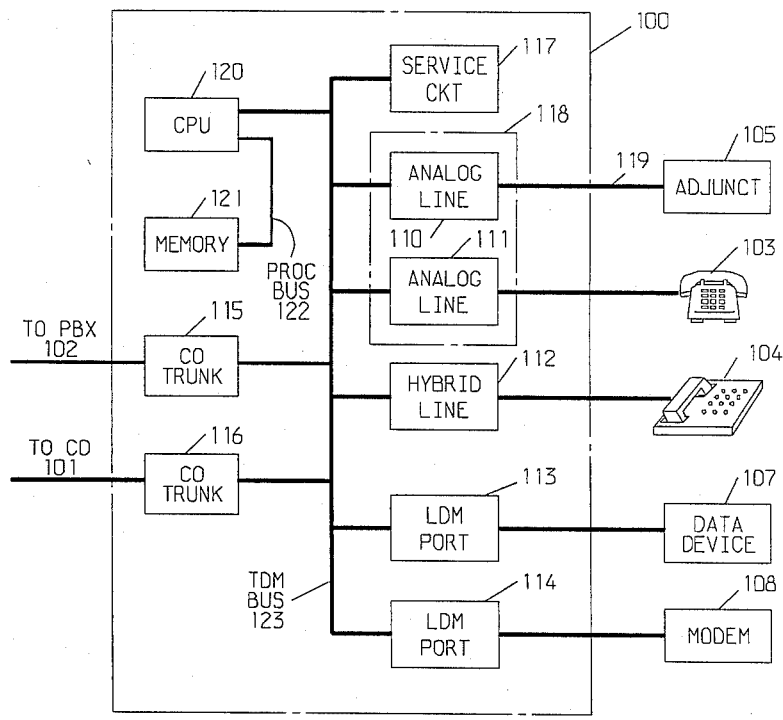
FIG. 1 shows a block diagram of an illustrative communication system which may incorporate the present invention.

Shown in FIG. 1 is a communication controller 100 (e.g., a private branch exchange, PBX) which may embody the present invention. The present invention may be utilized to establish communication connections to a central office (CO) via trunk 101 or to another PBX via trunk 102.

The PBX 100 controls in a well-known manner call processing between the trunks (e.g., 101), station sets (e.g., 103, 104), or adjunct devices (e.g., 105) connected to the system ports (110–116). The system controller includes a central call processor unit (CPU) 120, which connects over a processor bus 122 to memory 121. Memory 121 includes random-access memory and read-only memory which stores the system call processing programs, including the programs (i.e., FIGS. 4–11) and table (i.e., FIG. 3) utilized by the present invention.

The CPU 120 communicates over a time division multiplexer (TDM) bus 123 to a plurality of intelligent system port circuits (110–116). PBX 100 has a distributed switching network architecture whereby some of the common circuitry is incorporated into the microprocessor controlled port circuits (110–116). The port circuits may include a variety of line circuits—for example, analog line circuits 110, 111 for interfacing to adjunct 105 and analog telephone 103; hybrid line circuit 112 for interfacing hybrid telephone 104; and digital line circuits 113, 114 for interfacing to data device 107 and modem 108. Groups of line circuits of the same type (e.g., 110 and 111) may be arranged on common printed circuit boards (e.g., 118).

In accordance with the present invention, both adjunct 105 and the analog telephone (standard single line set) 103 are attached to the same type line circuits (i.e, 110) on the PBX; no special line interface is required. The adjunct 105 communicates over station loop 119 to analog line circuit 110 in a manner that is electrically indistinguishable from the standard single line telephones. Since the adjunct 105 is a program-controlled device that has DTMF tone outpulsing capability, it can be programmed to respond to the ringing and DTMF tone signals from the PBX to activate PBX features in the same manner as a human user at a station set. For example, adjunct-activated message waiting and call transfer features are described in later paragraphs. Other system features that involve switch-hook flashes and adjunct dialing, such as call park, call forwarding, conference, etc., could also be implemented in a straightforward manner in accordance with the present invention. Moreover, the adjunct could be programmed to output a call accounting message to the PBX to identify the proper call accounting for the particular call. The adjunct 105 receives a data message in the form of DTMF tones from a line circuit (e.g., 110) under control of controller 120 in accordance with the present invention. These DTMF tones are outputted when adjunct 105 goes off-hook, prior to the connection of the calling party to the adjunct 105, to select the operating mode at the adjunct.

Illustratively, in accordance with the present invention, adjunct 105 is a programmable voice message system which can tailor the voice response message played to the caller as a function of the operating mode and other information provided in the DTMF data message it receives from PBX 100. Adjunct 105 will be described in more detail in a later section of the specification.

The ability to pass a data message as DTMF tones from PBX 100 to the adjunct 105 without requiring a special hardware interface reduces the cost of implementing the arrangement to the customer by requiring only additional common control software. The port circuits may also include a variety of trunk circuits, such as 115, 116, for interfacing to central office (CO) trunks 101, 102. Additionally, PBX 100 may include a variety of service circuits, such as 117, which provide tone/clock generation, tone detection, speech synthesis, etc., for the system.

Before proceeding with the operating description of the present invention, it should be recognized that the present invention may also be utilized in other telephone communication systems. Since such systems utilize a variety of hardware and programming techniques, no attempt is made to describe the program used to control the communication system. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the timing diagram of FIG. 2, the table of FIG. 3 and the flow charts of FIGS. 4–11 to describe the logical steps and the various parameters required to implement the present invention. The DTMF software interface shown in FIGS. 4–11 is used to communicate between the PBX 100 standard call processing software and the line circuit (station port) 110 that interfaces to adjunct 105. FIGS. 12–17 describe the operation of the present invention at adjunct 105.

DETAILED DESCRIPTION

In the following description, each element of each figure has a reference designation associated therewith, the first number of which refers to the figure in which the element is located (e.g., 101 is located in FIG. 1).

Figure 2:
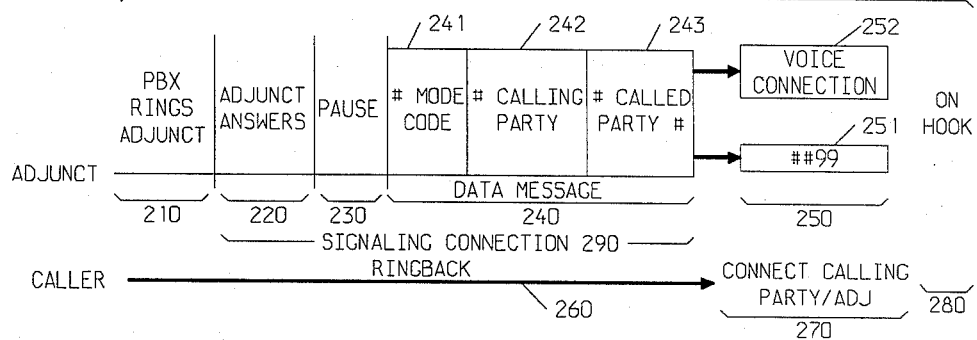
FIG. 2 shows the timing of signals to the adjunct and calling party.
Figures 3, 4:
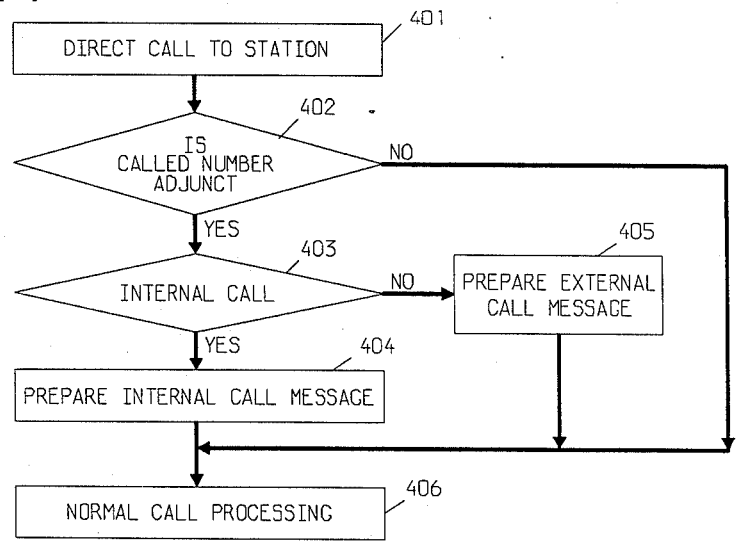
FIG. 3 shows a table describing the format of the data message transferred from the PBX to the adjunct.
FIGS. 4–11 show flow charts describing the operation of the present invention at the PBX.

With joint reference to FIGS. 1, 2 and 3, the operation of the present invention is described. Adjunct 105 may receive internal calls (from station sets 103, 104) or external calls (via trunks 101 or 102). When a calling party calls an adjunct, the PBX 100 rings 210 the adjunct 105 via station port 110. When adjunct 105 answers 220, a signaling connection 290 is established between the PBX 100 and adjunct 105 over which DTMF signals can be passed. During the signaling connection 290, the PBX 100 pauses for a period of time 230 and then outputs a DTMF data message shown as 240 of FIG. 2. During this time the calling party continues to receive a ringback tone 260 and does not know that the called adjunct 105 has gone off-hook 220.

As an aid to voice messaging system adjunct 105, the PBX 100 provides a predetermined pause 230 prior to delivering the data message 240; this allows for adjustment time between PBX 100 and the adjunct 105 before any useful data is communicated therebetween.

The data message 240 outputted to adjunct 105 includes a call mode code (241) which may be followed by calling station number 242 and called station number 243. The mode code 241 is of the form "#nn", where the "#" touch tone signal precedes some number between 00 and 99. The station number is also preceded by the "#" touch tone signal. Shown in table 310 of FIG. 3 is an exemplary list of call mode codes. Both the mode code 241 and any station information 242, 243 are outputted to the adjunct 105 in the form of DTMF digits. The mode code 241 represents the call type, illustratively, a direct call via access station (#00) and trunk (#01); coverage station (#02) and trunk (#03); spare (#04); leave word calling (#05); update MW lamps (#06); maintenance (#07); out of service (#08); and disconnect (##99). Certain mode codes e.g., Leave Word Calling (#05), specify how any subsequent DTMF tones should be interpreted (e.g., calling extension or called extension). For example, the mode code 241 Leave Word Calling (#05) indicates that the calling and called extension numbers follow, and the mode code 241 for MW Lamp Update (#06) indicates that no extension station information will follow. The mode codes 241 are only illustrative, other functions can be implemented by adding mode codes in accordance with the present invention.

As shown in 240, fields of the data message are separated by a "#" signal; the mode code will be followed by a "#" signal as will each number passed. The calling station number 242, if supplied, always precedes the called station number 243 when both are part of the data message 241. For example, see call coverage mode code #02 of FIG. 3.

Thereafter, the data message 240 of FIG. 2 is followed during time period 250 by a disconnect code (##99) 251 from the PBX to drop the line, or a voice connection path 252 is established between the calling station and adjunct 105 via the system station port 110. The disconnect code (##99) is sent to the adjunct 105 at any time when the PBX is about to disconnect the port. This enables adjunct 105 port to initiate its own hang-up procedures since adjunct 105 may not be capable of recognizing calling part electrical disconnect signals. PBX 100 also sends an electrical disconnect signal by interrupting the loop current to adjunct 105. For example, the Leave Word Calling (#05) code requires no talking path and would therefore be followed by a disconnect code (##99). The direct dial access (#00) or call coverage (#02 or #03) mode requires a voice connection provided by PBX 100 between the calling party and adjunct 105 to transfer audio messages therebetween. During this voice connection, adjunct 105 may use in a well-known manner prerecorded voice response to prompt the calling party to enter touch-tone digits to access a particular operating capability of the adjunct.

The mode code information 241 conveys to adjunct 105 the call history, i.e., how this call has come to be answered by adjunct 105 and how adjunct 105 is to handle the call. The data message 240 includes the mode code information 241, which is information the PBX 100 knows about the incoming call, and includes information that the PBX obtains from the calling party (e.g., called party number). Mode codes infer certain fields in digit stream should be empty or filled. For example, an external and direct call (#01) infers by its definition that no calling extension information is available (external call) and no called information is useful (direct call). And, a Leave Word Calling call (#05) infers that both calling and called extension information is essential to perform the LWC feature. And, a Maintenance Check call (#07) infers that neither calling nor called extension information is useful. Thus, mode codes are functional descriptions of the call type.

After the voice connection is made to the adjunct 105 during 270, the adjunct can request PBX 100 attention via a switch-hook flash. When a caller is connected to the adjunct 105 and records a message for another station on the system, the adjunct 105 performs a MW lamp-light feature by switch-hook flash followed by #90 and the station extension of message recipient. When a caller is connected to the adjunct 105 and listens to and deletes all stored personal messages belonging to the caller, the adjunct 105 performs a MW lamp-extinguish feature by switch-hook flash followed by #91 and station extension of caller. PBX 100 acknowledges the lighting or extinguishing of the MW lamp by outputting a confirmation tone or recorder tone to adjunct 105.

When a caller is connected to the adjunct 105 and directs the adjunct 105 to transfer the call to some other station on the system, the adjunct 105 performs a transfer operation by switch-hook flash followed by the extension of other station and then hang-up. A voice connection 250 is concluded when either adjunct 105 or the calling party goes on-hook at time period 280.

A more detailed description of the operation of the various modes will be described in the following paragraphs with reference to the DTMF software interface flow charts of FIGS. 4–11.

FIG. 4 describes the Direct Dial Access modes (#00 and #01) of operation. When a direct call is received in step 401, then PBX 100 checks in step 402 if the called number is the number of a port which makes use of the DTMF interface described here, adjunct 105. If adjunct 105 has been called, the PBX 100 checks, step 403, if the call is an internal call. If the call is an internal call (e.g., from a station 104 of FIG. 1), PBX 100 prepares in step 404 a digit stream or data message 240 using mode code #00. If the call is an external call (e.g., received over trunk 102 of FIG. 1), then PBX 100 prepares, in step 405, a data message 240 using mode code #01. Thereafter, PBX 100 outputs the message to adjunct 105 and resumes normal call processing in step 406. If the called number in step 402 is not the number of adjunct 105, the normal call processing step 406 follows.

When the adjunct 105 is a voice messaging system, the present invention allows internal or external callers to directly access the voice messaging system to administer their personal greeting, change their password, or retrieve their messages. If the voice messaging system port is dialed and available, PBX 100 rings it and establishes a connection when it answers. The PBX 100 then outputs a call mode code, indicating direct access, followed by the calling extension if the call is internal; no extension will be supplied for external calls. The PBX 100 then provides a talking path between the caller and the adjunct 105. The adjunct 105 may likely prompt for missing or mismatched extension information and a password, if required. The adjunct 105 may also likely provide a menu of touch tone driven features such as "administer personal greeting", "password change", and "retrieve messages". The PBX 100 terminates the conversation when it recognizes an on-hook from either the calling party or adjunct 105.

At the conclusion of the session, if the stored messages for the user have been reduced to zero, the adjunct 105 may initiate an attempt to extinguish the Message Waiting lamp on the caller's station. Also at the conclusion of the session, if the caller stored a message for another station or stations, the adjunct 105 may initiate an attempt to light the Message Waiting lamp on each recipient's station.

Figure 5:
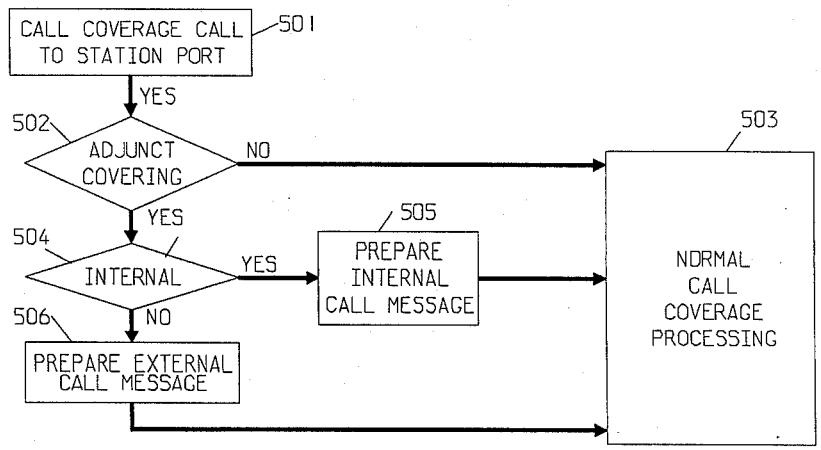

With reference to FIG. 5, the Call Coverage modes (#02 and #03) operation are described. PBX 100 knows a Call Coverage call by checking a station translation table (not shown) for the called station number.

The PBX 100 attempts call setup to a possible coverage member (i.e., a station assigned to cover for a called station) in step 501. When a station coverage member is available, then in step 502 PBX 100 determines if the available member is adjunct 105.

If the member is not the adjunct 105, then PBX 100 in step 503 enables normal call coverage processing. When the member is adjunct 105, then in step 504 PBX 100 determines if the call is an internal call from a station or an external call received over a trunk. For an internal call, an internal Call Coverage message (i.e., mode #02) is prepared for output to adjunct 105 in step 505. After the internal Call Coverage message is prepared for adjunct 105, control is returned in step 503 to normal call coverage processing (e.g., the calling party is connected to the ringing coverage station, the adjunct 105).

When PBX 100 determines that an external call has been received, an external call message (i.e., mode #03) is prepared in step 506 for output to adjunct 105. Again, control is thereafter passed to normal call coverage processing.

When the adjunct 105 is a voice messaging system peripheral in the call coverage mode and the PBX 100 determines that an internal call has been received, the present invention enables PBX 100 to output the extension of the calling station followed by the extension of the covered station, delimited by the pound sign #; the calling party will not have to enter either their own or the called extension for the voice messaging system peripheral unless the peripheral determines that the prepared message from PBX 100 was corrupted. The delimiter may be used by the attached adjunct 105 to avoid internal timeouts and begin a personal greeting or peripheral system greeting and a corresponding menu. The PBX 100 then provides a talking path between the caller and the voice messaging system port. The calling and called extension information may be used by adjunct 105 to assemble message header information from an on-line data base (using name/extension matching).

In the case of an external caller mode (#03), in step 503, only the called party number or extension would be available and adjunct 105 would have to prompt the caller for additional data, if needed. It is likely that outside callers would have to identify themselves in the actual message since they may not have an extension entry in the adjunct 105 data base.

The adjunct 105 system might review an available menu of touch tone driven features, such as "begin recording your message", "rewind and listen to your message", "cancel your message and record another", or "deliver your message", as well as other possible features.

If a message has been collected for the covered station during the conversation, the peripheral system may subsequently attempt to light the Message Waiting lamp on the covered station as a separate call operation.

Again, PBX 100 terminates the conversation when either adjunct 105 or the caller has been detected going on-hook.

Figure 6:
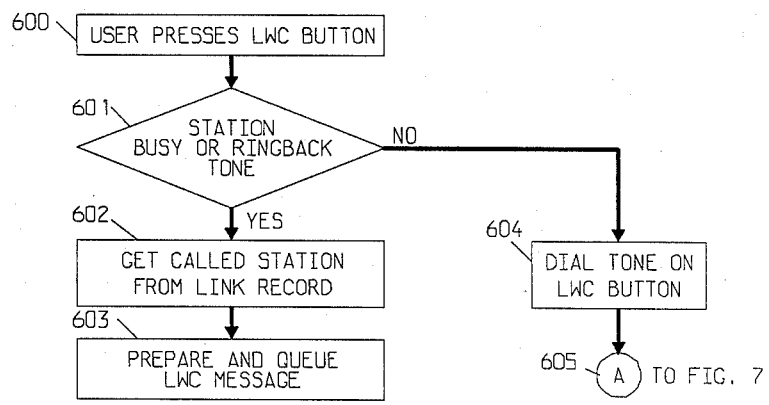

The Leave Word Calling mode #05 is described with reference to FIGS. 6, 7 and 8. When internal caller A calls station B, who is either busy or doesn't answer, caller A may simply wish to leave a "return my call" message for caller B and avoid going to call coverage. A LWC button pressed at the caller station A 600 or a LWC dial access code 700 initiates the LWC operation at PBX 100. With reference to FIG. 6, when the user presses a LWC button 600, PBX 100 determines whether the calling station is connected to a busy called station or if the called station line has not yet answered 601 (i.e., ringback tone received by calling station). If the calling station receives the busy or ringback tone, PBX 100 gets called station number from the link record 602. The PBX 100 then prepares and queues a LWC message (#05) for the called station 603 and aprovides confirmation tone to the caller. Meanwhile, the caller may then go on-hook.

If the calling station does not receive a busy or ringback tone (e.g., when the calling station is using the LWC button not in conjunction with an existing call), then PBX 100 treats the LWC operation as a call origination operation and provides dial tone on the LWC button 604. Thereafter, the PBX begins to collect digits for the LWC message 605.

Figure 7:
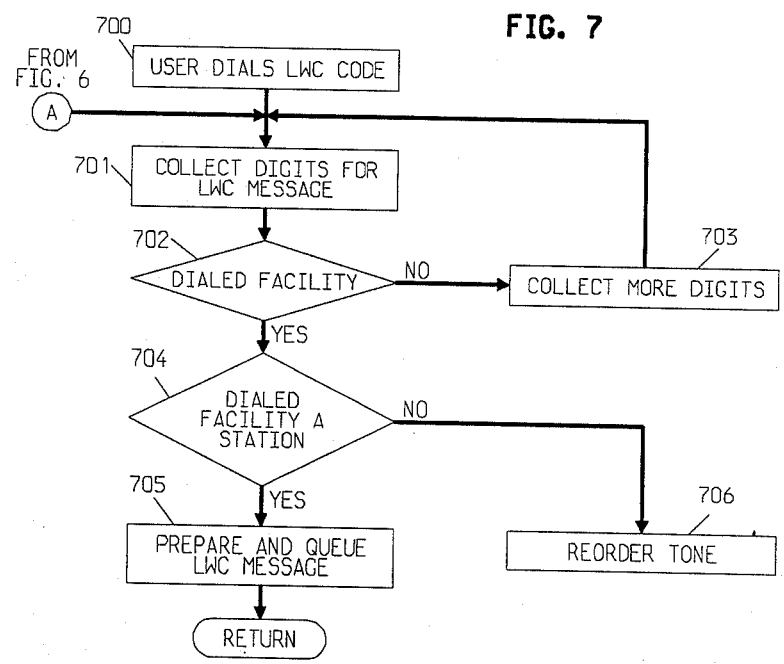

FIG. 7 describes the scenario when a user presses a LWC button without another active call in progress or when a calling station dials the LWC dial code (700). PBX 100 collects LWC digits in step 701. PBX determines, in step 702, whether enough digits have been received to determine a called facility. If not, then additional digits are collected in step 703. When enough digits are received, PBX 100 determines if the dialed facility is a station in step 704. If so, then PBX 100 prepares and queues a LWC message for the called party in step 705. If the dialed facility is a non-station port, PBX 100 sends a recorder tone to calling party in step 706.

Figure 8:
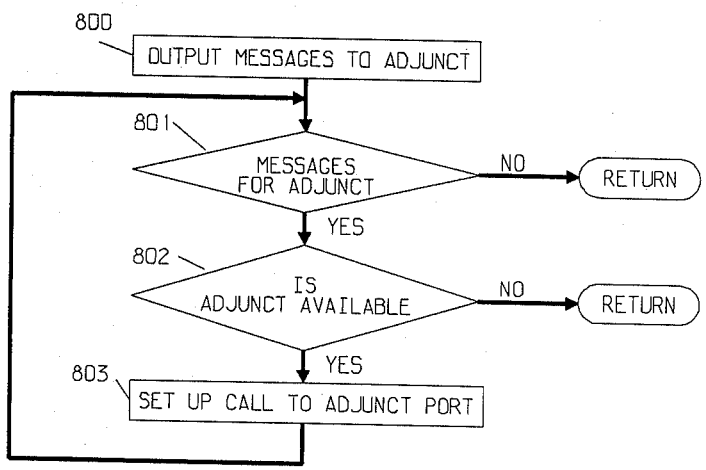

With reference to FIG. 8, PBX 100 determines if there are queued messages for adjunct 105. Message types may include Leave Word Calling, Message Waiting Lamp Refresh, Bad Port Maintenance Check, and Bad Port Identification. If there are messages for adjunct 105, PBX 100 checks if adjunct 105 is available, 802. If adjunct 105 is available, PBX 100 takes a message from the queue and sets up a call to adjunct 105 with the message in step 803. If there are no messages for adjunct 105 or adjunct 105 is not available, PBX 100 returns to normal call processing. The PBX 100 then calls a voice messaging system 105 to deliver the request. If the voice messaging system 105 answers, the digit message with the stored mode code is outputted and PBX 100 terminates the connection. In the case of a LWC message, the peripheral system 105 then assembles a message from prerecorded fragments and stores it for the called station B. The peripheral system 105 lights the called station B MW lamp. When the called station B returns the call, PBX 100 sends adjunct 105 a direct dial access mode #00 data message and adjunct 105 outputs the prerecorded message to station B. In the case of Message Waiting Lamp Refresh, Bad Port Maintenance Check, or Bad Port Identification, the adjunct is expected to perform the appropriate and corresponding task.

The Message Waiting (MW) Lamp Refresh mode #06 (not shown in flow chart) operates as follows. When PBX 100 experiences a restart (station MW lamp states may be lost or made unreliable), the PBX 100 assembles a digit message consisting of mode code #06 and no station extension information and delivers it to a voice messaging system 105. When the voice messaging system 105 answers, the PBX 100 outputs the digit message and terminates the connection. The peripheral system 105 then will query its data base and, for each station for which it is storing a message or messages, initiates an attempt to light that station's MW lamp.

Figure 9:
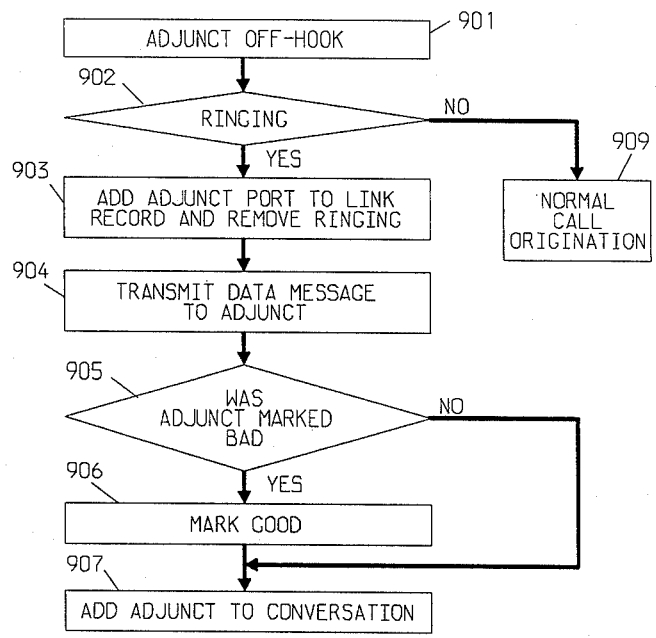

FIG. 9 describes the operation when adjunct 105 (which may be a voice message system) goes off-hook. In step 901, adjunct 105 goes off-hook. In step 902, PBX 100 determines if the adjunct port was previously ringing. If previously ringing, then PBX 100 adds adjunct 105 port to the call link record, 903, and the ringing signal is removed. In step 904, PBX 100 outputs the appropriate data message 240 to adjunct 105. In steps 905 and 906, PBX 100 clears the adjunct 100 bad status bit. In step 907, PBX 100 connects adjunct 105 to calling party.

In step 902, if adjunct 105 goes off-hook but not in response to a ringing signal a call origination routine 909 is enabled by PBX 100. Adjunct 105 can originate calls to PBX 100 by touch-tone dialing a called station.

Figure 10:
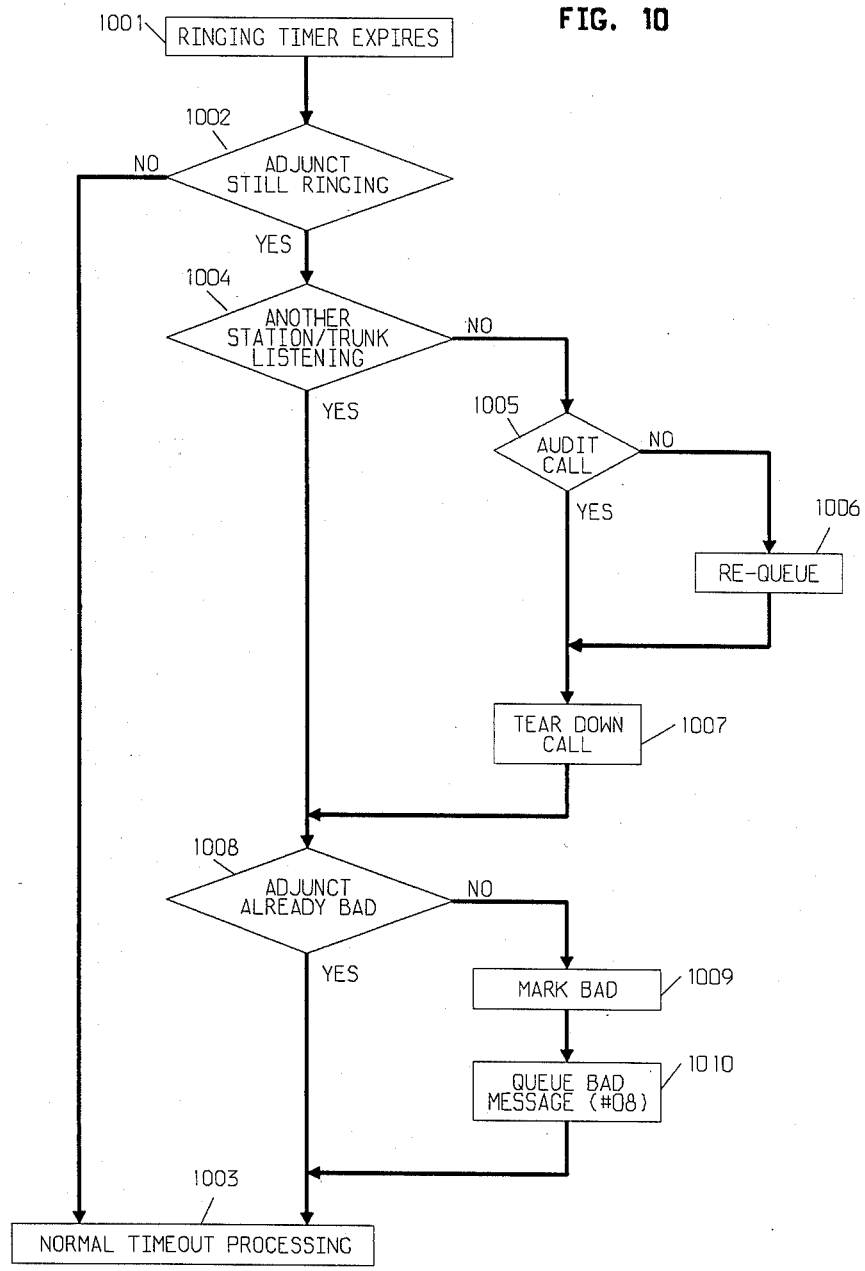

With reference to FIG. 10, if the software timer (set by the PBX when the adjunct starts to ring with a call) expires 1001, the PBX first checks if the adjunct is still ringing, 1002. If not, the timeout is disregarded with respect to the adjunct and normal timeout processing 1003 is performed. Normal timeout processing may involve other less specific connection-related tasks.

If the adjunct is still ringing, the PBX checks for another conferee (station or trunk) on the link 1004. The adjunct may ring with calls that do not have other conferees, such as maintenance checks, message waiting lamp updates following a system restart, leave word calling messages, and bad adjunct port messages. If there is no other conferee, a further test is made to determine if the call is a maintenance check, initiated by a software audit 1005. If not, the call is re-enqueued for delivery to another adjunct port 1006. The PBX then performs a tear-down procedure on the call 1007. Note that if there is another conferee (station or trunk), the call is not torn down.

The PBX then tests a status bit, which identifies the port as previously marked bad 1008. If the port has not already been marked bad, the PBX marks it bad at this time 1009 and prepares and enqueues a bad port message (#08) 1010. The PBX then resumes normal timeout processing.

Figure 11:
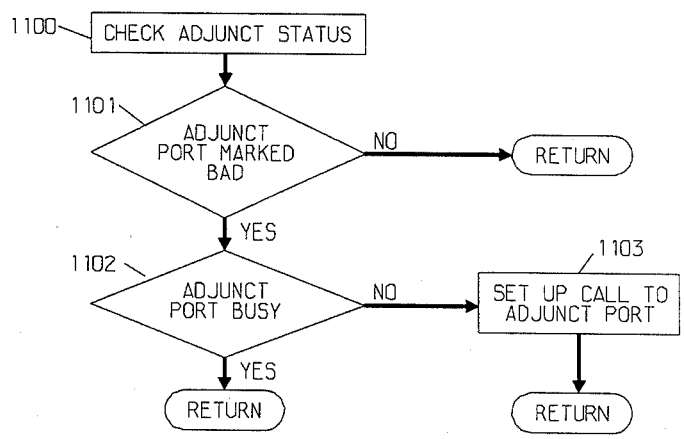

With reference to FIG. 11, during normal call processing the PBX periodically examines the status bits associated with each adjunct port 1100. If a particular adjunct port is marked bad 1101, the PBX checks if the adjunct port may be rung with a maintenance check call 1102. If the adjunct port is not busy with another call, the PBX performs a call setup 1103 with the Maintenance Check mode code (#07) and rings the bad adjunct port. This operation includes setting a software timer to time the ring. Note that all calls which ring an adjunct port have similar software times active.

ADJUNCT OPERATION

Figure 13:
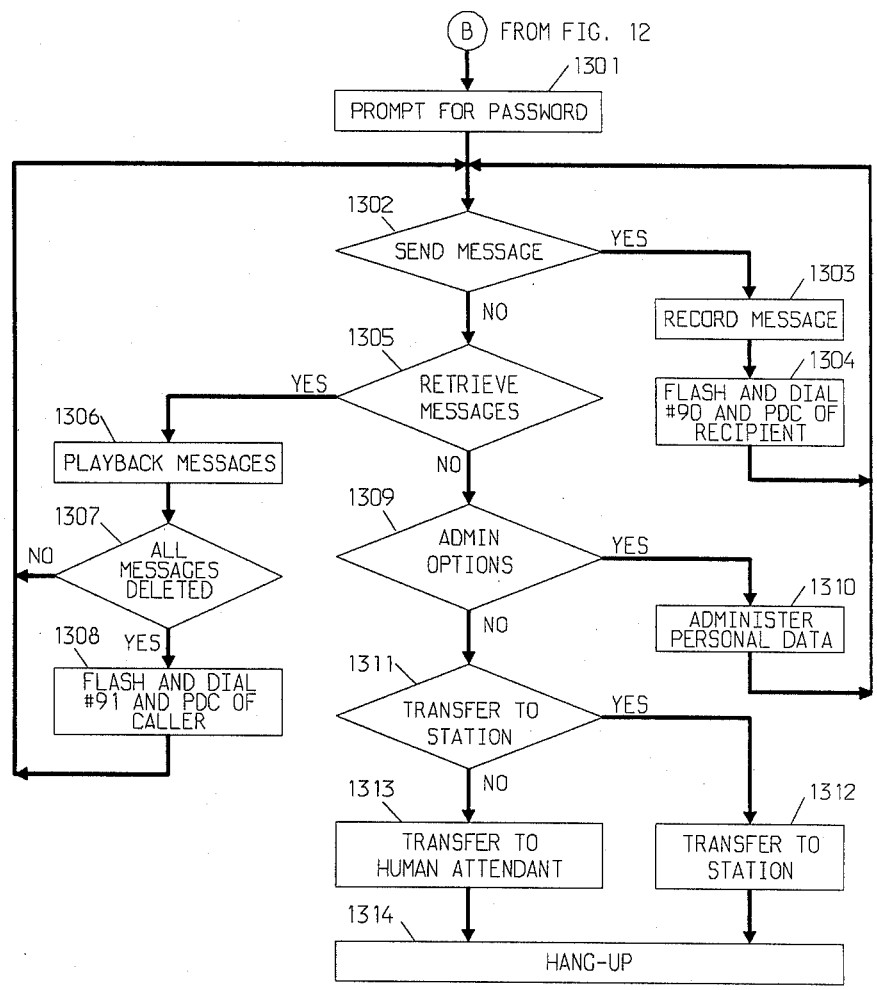

In accordance with another aspect of the present invention, adjunct 105 goes off-hook in response to a ringing signal and thereafter receives multi-frequency tones from PBX 100 which are used to select the particular operating feature mode of the adjunct 105. FIG. 13 illustrates the main menu of system operating features.

Figure 12:
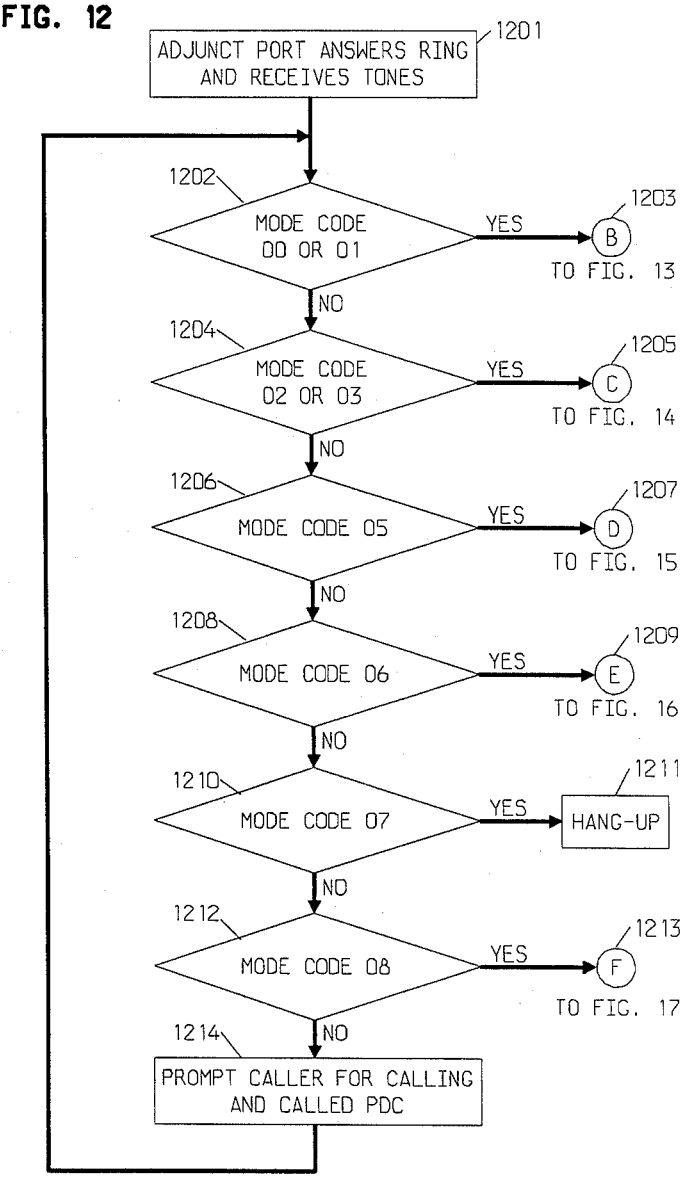
FIGS. 12–17 show flow charts describing the operation of the present invention at the adjunct.

With reference to FIG. 12, the adjunct 105 goes off-hook 1201 and receives a mode code of either #00 or #01 in step 1202. In response, adjunct 105 performs a basic voice mail function, 1203. With reference to FIG. 13, adjunct 105 prompts the caller for login identification (PDC and password) and further optional information, 1301. The options include:

send a message to another voice mail user, 1302
retrieve messages, 1305
administer options such as personal greeting or password, 1309
transfer to another station, 1311
transfer to a human attendant, 1313

If the caller elects to send a message, 1302, adjunct 105 records the message and prompts for the PDC of the recipient, 1303. The message is then stored for the recipient and adjunct 105 lights the recipient's Message Waiting lamp, 1304. To accomplish this, adjunct 105 sends a switch-hook flash and dials #90 (the light Message Waiting lamp feature code) and the PDC of the recipient. The adjunct then returns the caller to the main menu, 1315, to possibly perform another function (send message, retrieve messages, etc).

If the caller chooses to retrieve messages, 1305, adjunct 105 plays back the caller's messages one at a time, 1306, allowing them to be deleted after each playing. As long as one caller's message remains, 1307, the system returns the caller to the main menu, 1315, without attempting to turn off the caller's Message Waiting lamp. If, after the playing of all stored messages, 1307, all messages have been deleted, the adjunct attempts to turn off the Message Waiting lamp of the caller, 1308. To accomplish this, adjunct 105 sends a switch-hook flash and dials #91 (the extinguish Message Waiting lamp feature code). The adjunct 105 then returns the caller to the main menu, 1315, after the last message has been processed (played and possibly deleted).

If the caller wishes to administer options, 1309, adjunct 105 prompts for which option (such as changing a personal greeting or password) and administers or performs, 1310, the relevant updates. The adjunct 105 then returns the caller to the main menu, 1315, for further direction.

If the caller indicates that the call should be transferred, 1311, adjunct 105 prompts for the identity of the station to which the call should be transferred and performs a transfer operation, 1312, and hangs up, 1314.

If the caller does not give the adjunct direction, adjunct 105 by default transfers the call to a human attendant, 1313, and hangs up, 1314.

Figure 14:
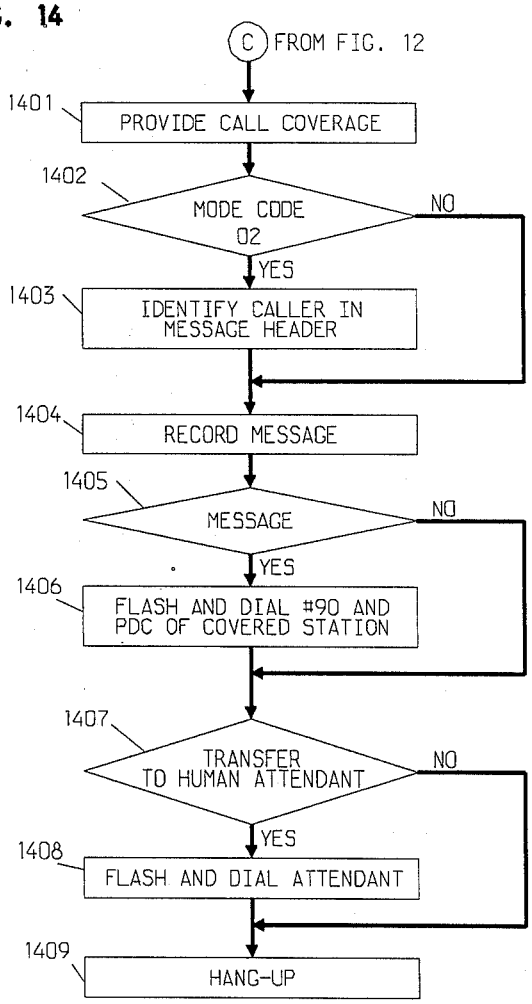

Returning to FIG. 12, when the adjunct goes off-hook and receives the mode code #02 or #03, step 1204, adjunct 105 performs a Call Coverage operation, 1205, shown in FIG. 14. In FIG. 14, step 1401, the Call Coverage mode is entered. In step 1402, when the mode code is #02, adjunct 105 expands the message header with the name of the caller, 1403; this correlation is made by matching the PDC in the calling field with an entry in the adjunct's database.

The adjunct then records a message from the caller, 1404, and places it in the called station's mailbox, with any additional header information. If no message is recorded, the call is transferred, 1405, to a human attendant, 1407. If a message is recorded, the adjunct lights the Message Waiting lamp of the called station, 1406. Again, this occurs by adjunct 105 sending a switch-hook flash and dialing #90 and PDC of the covered station in step 1406.

Finally, the adjunct offers the caller the option to be transferred to a human attendant, 1407, transfers the call if necessary, 1408, and hangs up, 1409. The transfer operation, 1408, occurs when adjunct 105 flashes the PBX 100 and dials the attendant station number.

Figure 15:
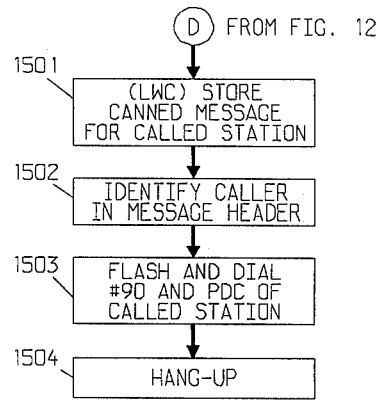

Returning to FIG. 12, when adjunct 105 goes off-hook and receives the mode code #05 in step 1206, the adjunct performs Leave Word Calling, 1207, shown in FIG. 15. In FIG. 15, step 1501, adjunct 105 stores a canned message for the called station and in step 1502 indicates the name of the caller in the message header. The adjunct 105 lights the Message Waiting lamp of the called station 1503, as previously described, and then hangs up, 1504.

Figure 16:
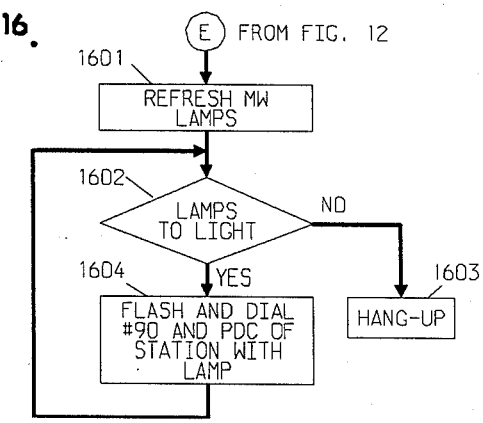

Returning to FIG. 12, when adjunct 105 goes off-hook and receives the mode code #06 in step 1208, the adjunct performs a Message Waiting Lamp Refresh feature, 1209, shown in FIG. 16. With reference to FIG. 16, in step 1601, the Message Waiting Lamp Refresh feature is initiated. The adjunct looks through its database, 1602, and, for each station that has a message stored, the adjunct attempts to light the corresponding Message Waiting lamp. When the database indicates that MW lamps are to be lit, each lamp is lit in step 1604. After all station storage has been examined and no more lamps have to be lit, the adjunct hangs up, 1603.

Returning to FIG. 12, adjunct 105 goes off-hook and receives the mode code #07 in step 1210. The adjunct understands a Maintenance Check is being performed by PBX 100 and simply hangs up, 1211; no further action is necessary.

Figure 17:
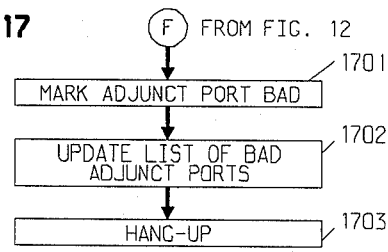

When the adjunct goes off-hook and receives the mode code #08 in step 1212, it performs the mark bad adjunct ports feature in step 1213 as described in FIG. 17. With reference to FIG. 17, the feature is entered in step 1701. Thereafter, adjunct 105 updates its list of bad adjunct ports, 1702, based on the PDC in the called station field, and then hangs up, 1703.

What has been described is merely illustrative of our invention. Other embodiments known to those skilled in the art could be utilized without departing from the spirit and scope of the present invention. Additionally, other applications to telephone or other communication systems other than the disclosed system are contemplated as being within the knowledge of one skilled in the art.

We claim:

1. A controller for use in a communication system connected to a communication line for receiving incoming calls and connected to an adjunct over a station set communication facility, said controller comprising means responsive to an incoming call addressed to said adjunct received over said line for sending a ringing signal over said station facility to said adjunct and means responsive to an off-hook signal from said adjunct for outpulsing over said station facility to said adjunct a plurality of multifrequency tones containing information identifying the type of call to be completed to enable said adjunct to respond to said incoming call, said outpulsing occurring prior to said controller connecting and incoming call to said adjunct.

2. The controller of claim 1 wherein said call type information includes a calling party number.

3. The controller of claim 1 wherein said call type information includes a called party number identified by said incoming call.

4. The controller of claim 1 wherein said call information includes a mode code for identifying the type of said incoming call.

5. The controller of claim 1 wherein said system includes a station set having a message waiting lamp, said station set connected over a second communication facility and wherein said incoming call leaves a message for the station set after the connection is established between said adjunct and the incoming call, said controller including means for detecting a switch-hook flash from said adjunct and means for receiving a signal from said adjunct for lighting said message waiting lamp at the station set.

6. The controller of claim 1 further including means for detecting a switch-hook flash from said adjunct following said outpulsing of said multi-frequency tones, and means responsive to said detection means for outputting a tone signal to said adjunct.

7. The controller of claim 1 further including means responsive to a detected on-hook condition on said line for sending a disconnect signal to said adjunct after said outpulsing to signal the disconnection of said incoming call.

8. The controller of claim 1 wherein said system includes a station set connected over a second facility to said controller and wherein said incoming call is originated from said station set and wherein said call information further includes said originating station set number.

9. The controller of claim 1 wherein said system includes a station set connected over a second communication facility to said controller, said controller further including call coverage means for receiving an incoming call over said line addressed to said station set and for transferring said call to said adjunct and wherein said call information further includes said station set number.

10. A communication system comprising a controller connected over a station set facility to an adjunct and adapted to receive calls over a communication line, and controller comprising means responsive to an incoming call to said adjunct received over said line for sending a ringing signal to said adjunct and means responsive to an off-hook signal from said adjunct for outpulsing to said adjunct a plurality of multi-frequency tones containing call information to enable said adjunct to respond to said incoming call, said outpulsing occurring prior to said controller connecting said incoming call to said adjunct; and said adjunct including means for receiving said ringing signal indicating said incoming call over said station facility from said system, means for generating an off-hook signal in response to said ringing signal, and means for receiving multi-frequency tones from said system.

11. The system of claim 10 wherein said controller further includes means responsive to a detected on-hook condition on said line for sending a disconnect signal to said adjunct to signal the disconnection of said incoming call.

12. The system of claim 10 further including a station set connected over a second facility to said controller and wherein said controller further comprises call coverage means for transferring an incoming call addressed to said station set to said adjunct and wherein said call information further includes said station set number.

13. An adjunct connected over a voice facility to a communication system and adapted to receive multifrequency tones and output voice signals thereover, said adjunct comprising means responsive to a ringing signal received over said facility for going off-hook, means operative following said off-hook condition for receiving tones over said facility and interpreting said tones as tones originated by said communication system to identify one of a plurality of operating modes that said adjunct is to operate.

14. The adjunct of claim 13 wherein said adjunct delays any signal transmission to said system until the termination of outpulsing of said tones by said system.

15. The adjunct of claim 14 wherein said signal transmission is a prerecorded message to said system.

16. The adjunct of claim 13 wherein said tones also identify a calling party number.

17. The adjunct of claim 13 including means for generating a switch-hook flash over said facility after receiving said tones.

18. The adjunct of claim 16 wherein said adjunct sends a system feature activation message following said switch-hook flash.

19. The adjunct of claim 13 wherein said tone also identify a called party number.

20. A communication system including a controller and an adjunct, the controller connected to a communication line for receiving incoming calls and connected to the adjunct over a station set communication facility, said system comprising at said controller means responsive to an incoming call addressed to said adjunct received over said line for sending a ringing signal over said station facility to said adjunct and means responsive to an off-hook signal from said adjunct for outpulsing over said station facility to said adjunct a plurality of multifrequency tones containing information identifying the type of call to be completed to enable said adjunct to respond to said incoming call, said outpulsing occurring prior to said controller connecting said incoming call to said adjunct, and at said adjunct means responsive to said ringing signal for generating an off-hook signal and means operative following said off-hook signal for receiving said tones over said station facility and interpreting said tones as tones originated by said communication system to select one of a plurality of operating modes at said adjunct.

* * * * *